Nov. 29, 1932.   A. DORFMAN   1,889,400
TOOL HEAD RETAINER
Filed Dec. 14, 1928
Fig. 1.
Fig. 2.
Fig. 3.
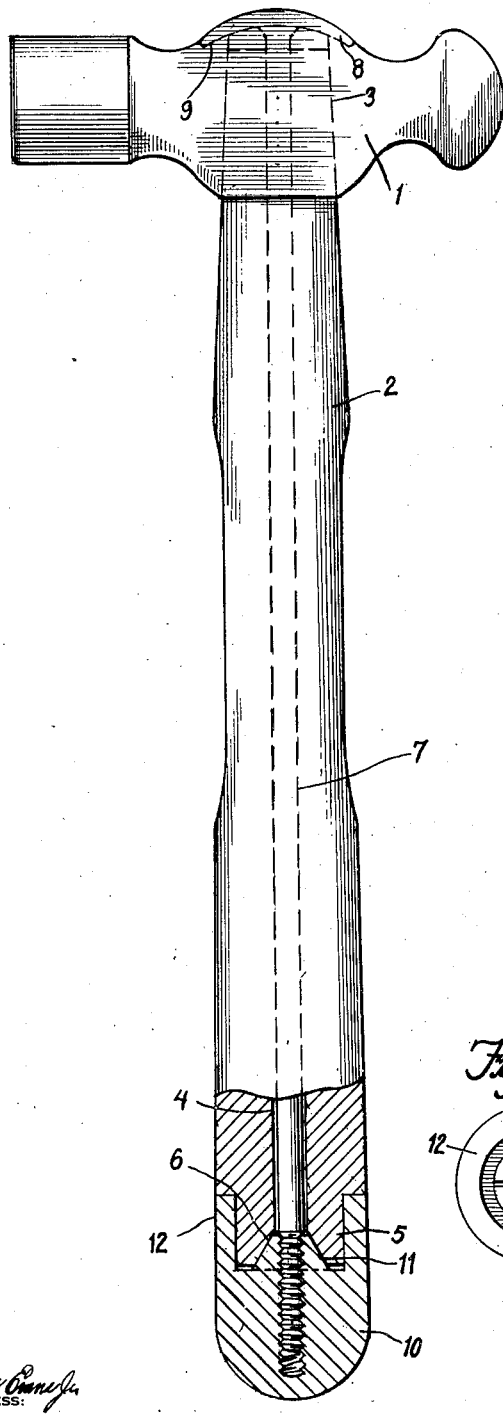
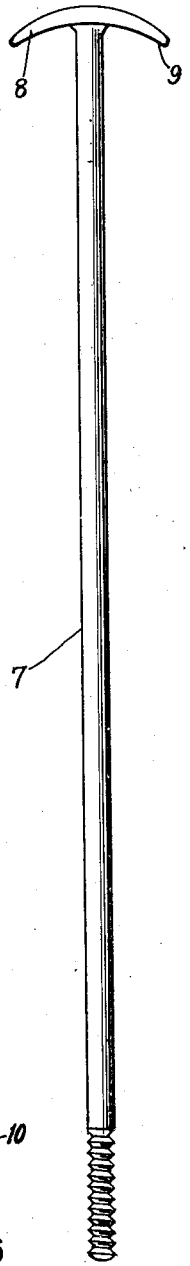
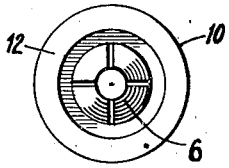
Albert Dorfman
INVENTOR
BY
ATTORNEY
WITNESS:

Patented Nov. 29, 1932

1,889,400

UNITED STATES PATENT OFFICE

ALBERT DORFMAN, OF HACKENSACK, NEW JERSEY

TOOL HEAD RETAINER

Application filed December 14, 1928. Serial No. 326,076.

This invention relates to a tool, the general object of the invention being to provide means whereby the head of the tool can be easily and quickly attached to the handle thereof without shaping the handle to the eye of the head and without danger of the head flying off the handle, even though the handle should break.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a side view, partly in section, showing the invention applied to a hammer.

Figure 2 is a view of the bolt for holding the head to the handle.

Figure 3 is a view of the inner end of the nut for engaging the free end of the handle and the threaded end of the bolt.

In these views, the numeral 1 indicates the tool head and 2 indicates the handle. The eye 3 of the head is tapered and one end of the handle is also tapered so that it can be adjusted in the eye and will fit the eyes of different sizes of heads. This tapering of the eye of the head and the corresponding tapering of the head end of the wooden handle is of importance. It is provided for all the eyes and all the handles of the entire line of manufacture built under the invention. The relative size of the tapered eye and of the tapered head end of the handle is such that the handle penetrates the eye short of its distal end as is shown particularly by the dotted lines in Fig. 1. Turning the end formation 10 which is in the form of a continuation of the handle 2 in a right-handed direction tends to tighten the seating of the head end of the handle 2 in the eye 3. The handle is formed with a bore 4 and with a reduced part 5 at its free end, a substantially conical recess 6 being formed in the outer end of the reduced part at the center thereof. The bolt head 8, as shown in Fig. 1, completely straddles the eye 3, positively engages the tool head and is entirely out of contact with the distal end of the handle 2. Unlike the practice many times employed in seating handles in tool heads, the eye in the handle tapers from the distal face of the tool head to the proximal or handle face of the tool head and does not flare outwardly from a central zone towards both outside faces, in which construction the seating of the tool handle is accomplished by expanding the distal end of the tool handle by means of a wedge, or the like. By my construction and combination, a broken tool handle may be ejected quickly and easily and a new handle may be fitted to the tool head merely by inserting it and tightening up the thru-bolt 7. No special seating or expanding of the distal end of the wooden handle in the eye 3 is required. A long bolt 7, having a curved head 8, is adapted to pass through the bore with its head engaging a countersink 9 formed in the outer part of the head. A nut 10 is screwed on the threaded end of the bolt which projects from the free end of the handle and this nut has a conical part 11 on its inner end which is split and internally threaded to engage the threads of the bolt, the splitting of this conical part providing a number of resilient portions which, when the nut is screwed home on the bolt, will enter the recess 6, which forces the resilient parts inwardly and thus clamps the nut on the bolt. The nut is also provided with an annular flange 12 which encircles the reduced part 5, as shown in Figure 1.

Thus it will be seen that the bolt and its head with the nut firmly connects the tool head to the handle and when the head becomes loose on the handle through wear, it is simply necessary to tighten the nut so as to cause the bolt to move the head over the tapered part of the handle to tighten the head on the handle. If the handle should break, the bolt will still hold the tool head in place and prevent it from falling off the handle and injuring any one.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination, a tool head having a tapered handle-receiving eye flaring from the distal side of said head to the proximal side of said head and being bounded by smooth surfaces and having a substantially similar cross-section throughout; a handle having a head end provided with a tapered eye engaging portion of similar cross-section to said handle-receiving eye but free from shoulder formation to permit adjustable takeup and of sufficient size that when tightly engaged in said eye it does not extend entirely therethrough and said handle having a central bore throughout its length; a bolt extending through said bore and having a bolt head straddling the distal end of said eye and a threaded extension at the other end adapted to extend out of said bore; and a tightening nut having threaded engagement with said bolt, frictional engagement with said handle, and shaped substantially to conform with and form an extension of said handle.

In testimony whereof I affix my signature.

ALBERT DORFMAN.